(No Model.) 6 Sheets—Sheet 1.
G. W. DYE.
DITCHING AND GRADING MACHINE.

No. 492,087. Patented Feb. 21, 1893.

Fig. 1

WITNESSES:
L. N. Porter
T. A. Murphy

INVENTOR:
George W. Dye
per Wm. K. White
Attorney.

(No Model.)  6 Sheets—Sheet 2.

G. W. DYE.
DITCHING AND GRADING MACHINE.

No. 492,087.  Patented Feb. 21, 1893.

WITNESSES:
C. N. Porter
T. A. Murphy

INVENTOR:
George W Dye
per Wm K White
Attorney (No Model.) 6 Sheets—Sheet 3.

G. W. DYE.
DITCHING AND GRADING MACHINE.

No. 492,087. Patented Feb. 21, 1893.

Fig. 3

WITNESSES: INVENTOR:

(No Model.)  6 Sheets—Sheet 4.
G. W. DYE.
DITCHING AND GRADING MACHINE.

No. 492,087. Patented Feb. 21, 1893.

Fig. 4

WITNESSES:
L. N. Porter
T. A. Murphy

INVENTOR:
George W. Dye
per Wm. K. White
Attorney (No Model.) 6 Sheets—Sheet 5.
G. W. DYE.
DITCHING AND GRADING MACHINE.

No. 492,087. Patented Feb. 21, 1893.

WITNESSES:

INVENTOR:
George W Dye
per Wm K White
Attorney

(No Model.) 6 Sheets—Sheet 6.

G. W. DYE.
DITCHING AND GRADING MACHINE.

No. 492,087. Patented Feb. 21, 1893.

WITNESSES:
L. N. Porter
T. A. Murphy

INVENTOR:
George W. Dye
per Wm K White
Attorney

UNITED STATES PATENT OFFICE.

GEORGE W. DYE, OF WASHINGTON, IOWA.

DITCHING AND GRADING MACHINE.

SPECIFICATION forming part of Letters Patent No. 492,087, dated February 21, 1893.

Application filed September 2, 1892. Serial No. 444,908. (No model.)

*To all whom it may concern:*

Be it known that I, GEORGE W. DYE, a citizen of the United States, residing at Washington, in the county of Washington and State of Iowa, have invented a new and useful Ditching and Grading Machine, of which the following is a specification.

My invention relates to a ditching and grading machine which is attached to a car, such car being propelled by motor power upon a temporary tram-road or rail road, and the elevator of my machine being operated by power transmitted to it from a stationary steam engine or other motor seated upon the car body. The machine is of that class having plows which detach and elevate the clay or earth as the car is propelled, throwing or depositing such clay or earth upon an inclined elevator frame provided with an endless elevator belt, which distributes or discharges the latter in line with the car as the same is propelled, forming a dump in which is distributed or mixed, coal slack or other fuel which is ignited or fired for the purpose of burning or baking the clay sufficiently for use as ballast for rail or other roads.

The objects of my invention are, first, to provide a frame or shell, to which is attached the plows and an inclined elevator, to suspend such frame or shell from the car body in such manner that the same may be adjusted vertically and laterally, and independently from said car body, second, to attach together two plows so that their points are in opposite directions in line, suspend the same by sleeves upon a plow supporting beam attached to the frame or shell, so that the plows may automatically adjust themselves longitudinally upon said beam for operation in connection with the elevator when a change in direction of the movement of the car is made; third, to so attach the plow supporting beam, to said frame or shell, as to permit it to be elevated or lowered, or one end elevated or lowered, independently of the other end, and retained in any such desired position; fourth, to so attach the plows upon the plow supporting beam as to permit the same to move thereon longitudinally within a prescribed distance, and yet rotate or turn with said beam, and to provide means for rotating said beam partially and retaining it in the desired position for the purpose of adjustment of said plows; fifth, to provide a frame or shell having the lower and central portions of its sides cut out to accommodate the inner end of the elevator and locate the same adjacent to the plows; sixth, to provide a self adjustable extension power shaft, bearings, and gearings for transmitting power from the motor seated in the body of the car to the drive shaft of the elevator, for operating the endless belt; and such other objects as will be hereinafter specifically pointed out and claimed. I accomplish these objects by the mechanism illustrated in the accompanying drawings, in which,—

Similar numerals of reference refer to similar parts throughout the several views.

1, represents the rail of a temporary railroad, 2, the ties to which the rails are affixed, 3 the body of an ordinary railway flat car, 4 its wheels, 5 an engine house upon the car body, and 6 a stationary engine of any desired pattern and form of construction. Secured upon the body of the car in any suitable manner is a jib-crane 7, the horizontal beam of which is slotted longitudinally in the usual form for the reception of the trolleys, and as these are usual and common to all jib-cranes they are therefore not illustrated in the drawings, and to the trolleys are suitably attached a chain block 8, of any desired pattern and form of construction, and to the chain block, is suspended in any suitable manner the vertical post 9. Two horizontal rack bars 10 and 11, in vertical line, extend outwardly and at right angles from the side of the car having proper slide-ways arranged in the body of the car, with suitable roller bearings 12, the outer ends of said rack bars being secured to the vertical post 9 by sleeves 13 and 14.

The frame or shell 15, is in form in cross section an inverted U shape, and of such length as may be desired, the lower central portions of its side being cut out as at 16 and 17 and this frame or shell upon its side adjacent to the car is securely bolted or otherwise fastened to the lower end of the vertical post 9. Suitably located upon the car body in proper bearings is a vertical shaft 18 with a lever or handle 19 attached to its upper end for manipulating or rotating the same and suitably attached upon said shaft are two pinions 20 (only the upper one being shown in the drawings), and both constructed to mesh with said horizontal rack bars 10 and 11. By means of the chain block 8 the vertical post and frame or shell may be raised or lowered as desired, and retained in the desired position, and by means of the pinions operating upon the rack bars, together with the trolleys suspending the chain block and its connections from the jib-crane, the shell or frame may be moved laterally from the car body, and in brief by these mechanical combinations the frame or shell may be moved both vertically and laterally, and independently from the car.

The plow supporting beam 22, the central portion of which is preferably rectangular in cross section as at 23, while the extremities are preferably circular in cross section as at 24, this beam is suspended horizontally at the side of the frame or shell nearest to the car; and I will now describe the mechanism I prefer to use for suspending the same. On the same side of said frame or shell near each end thereof I cut out an elongated vertical aperture or slot 25 and at the opposite side of said frame or shell I also cut out an elongated vertical aperture or slot 26 leaving parallel vertical ribs 27 at each side of the aperture or slot, and through which ribs in line I make a suitable aperture 28 for the reception of a cross pin 29. The two eye beams 30 are provided at one end with the eyes 31 which receive the ends of the plow supporting beam 22 where the same is circular in cross section, the opposite ends of such eye beams being provided with a series of pin holes 32. These eye beams are respectively inserted through the apertures or slots 25 and 26 and by means of the pin 29 passing through the apertures 28 of the vertical ribs 27 and the pin hole 32, the eye beams are secured or hinged to the frame or shell. In line above each elongated aperture or slot 25, and upon the same side of said frame or shell, I secure thereto in suitable bearings, a crank shaft 33, upon which shaft I secure a ratchet wheel 34, and to the shell so as to operate with said ratchet I secure a pawl 35, and I connect the inner end of each eye bolt to a crank shaft 33, by means of a chain 36. Near the respective ends of the plow supporting beams, I secure rigidly to the beam in any suitable manner, a vertical short bar 37, one extending upward and the other downward, and both provided near their ends with eye holes 38, in which respectively are attached a chain and threaded eye bolt 39, the threaded portion of which bolt passes through a suitable aperture in the opposite side of the frame or shell, where it is secured in position by a threaded nut 40. I preferably use two plows so that the clay or earth may be excavated when the car is being moved in either direction, but it will be seen that one plow may be used for excavating when the car is moving in one direction only.

Figure 1:
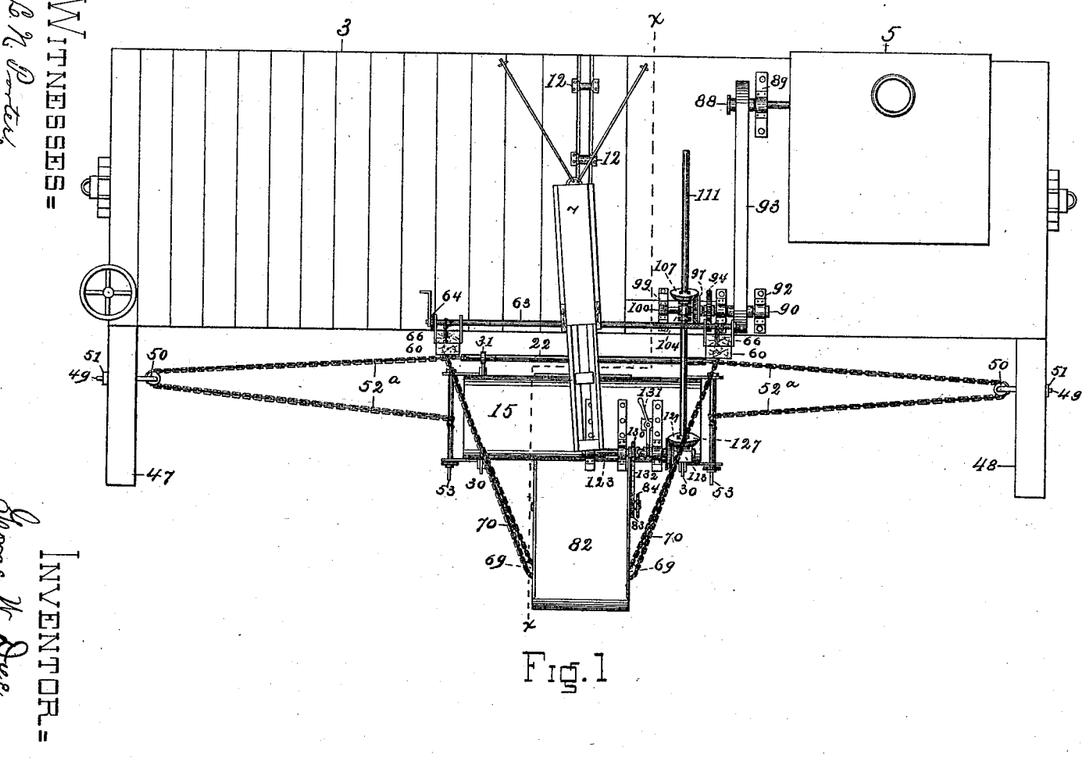
Figure 1, is a plan view of an ordinary rail road flat car, showing the plan view of my device attached, except I have omitted a view of the plows, and sprocket chain and wheel for driving the elevator belt.
Figure 2:
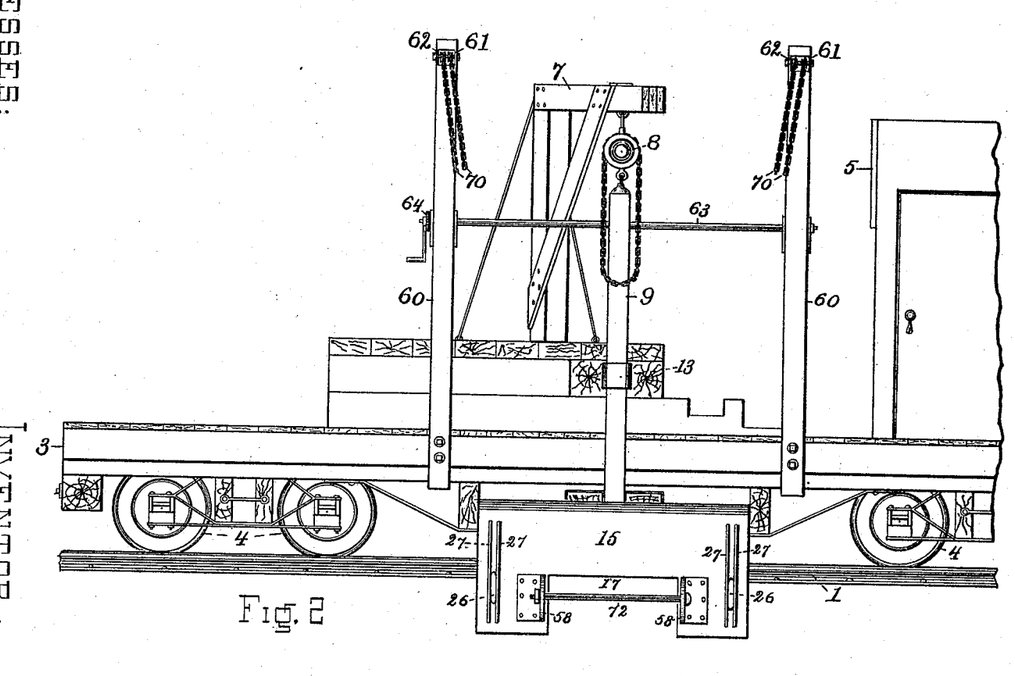
Fig. 2, is a side view of said car and my device attached, one end of the car being broken away, the plows and elevator, and mechanism for sustaining and adjusting the same, together with the mechanism for transmitting power to drive the elevator belt being omitted in the view.
Figure 3:
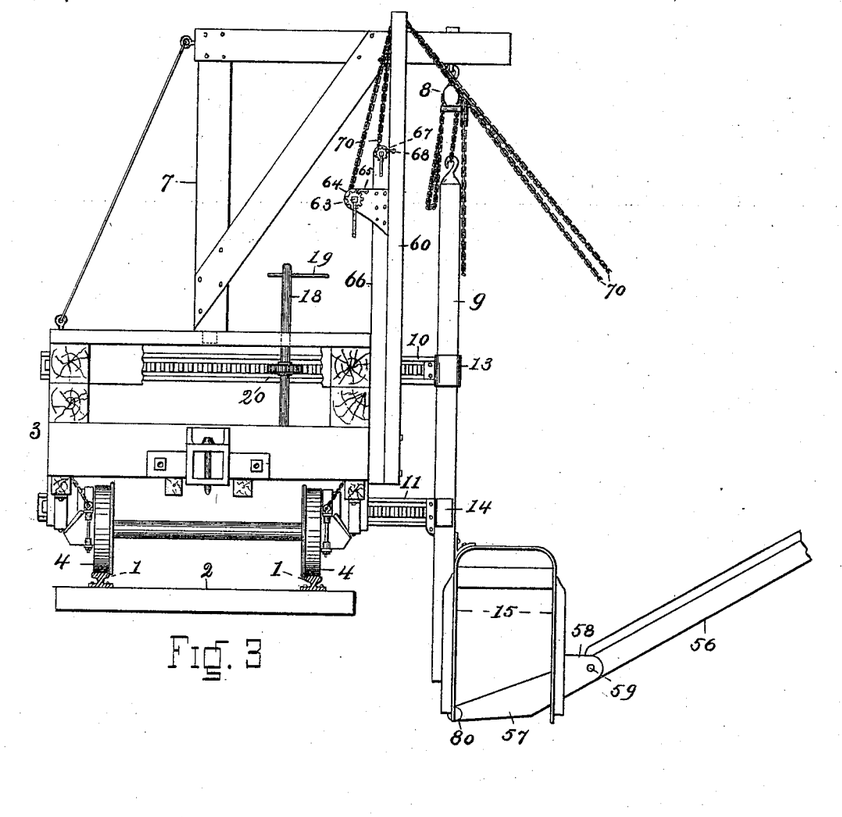
Fig. 3, is an end view of the car showing my device attached, a portion of the car body being broken away to show the rack bars and pinion, and also the plows, and mechanism for sustaining and adjusting the same as also the elevator being omitted from the view, but however a section of the elevator attached to the frame or shell is shown.
Figure 4:
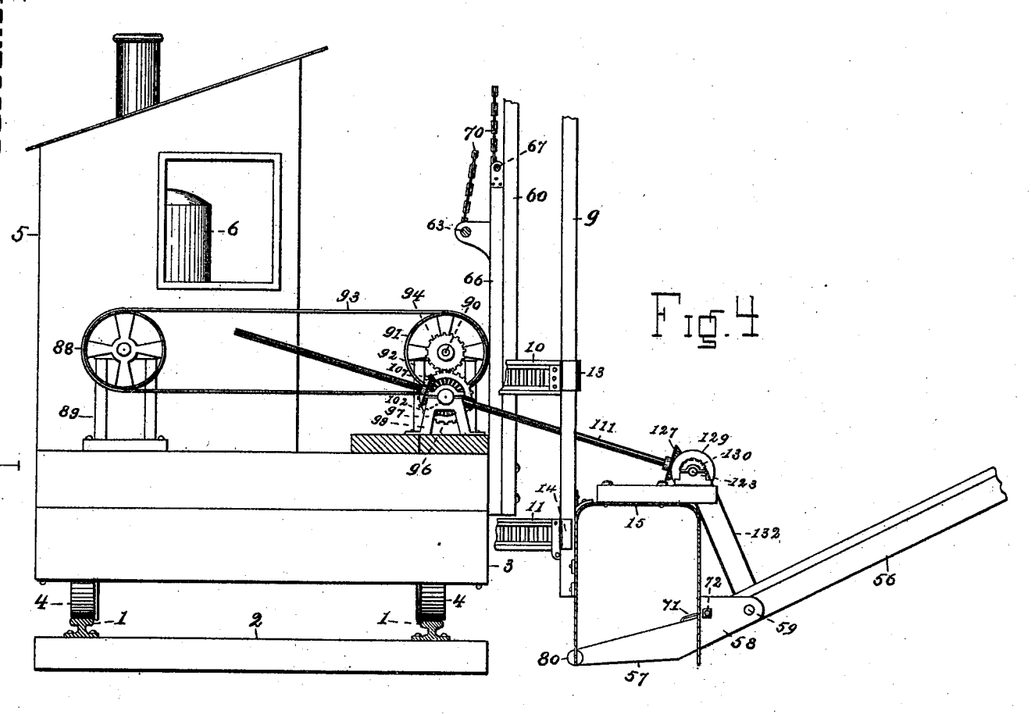
Fig. 4, is a view in cross section of the car with my device attached, taken on the line $x-x-$ of Fig. 1, except the plows and attachments, and handle of square jaw chuck is omitted, and only a section of the elevator is shown.
Figure 5:
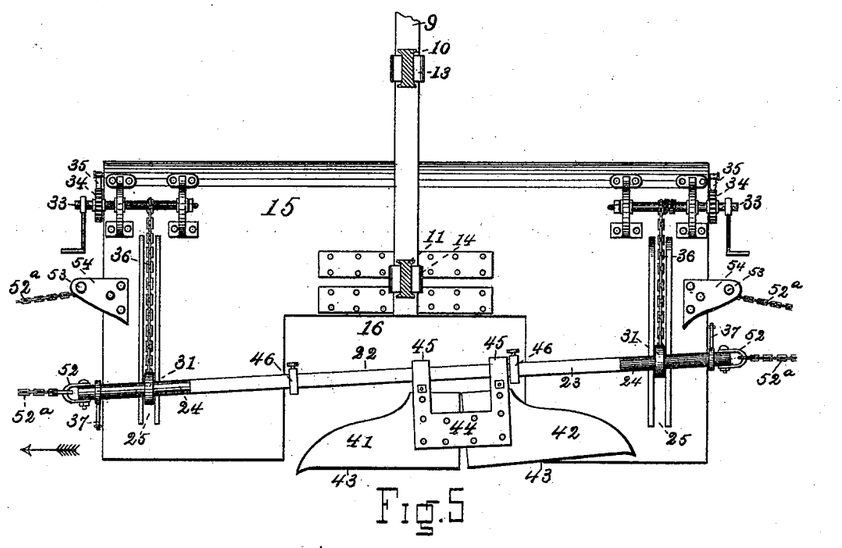
Fig. 5, is a view of the side of the frame or shell adjoining the car, together with the plows and mechanism for attachment and adjustment on the frame or shell.
Figure 6:
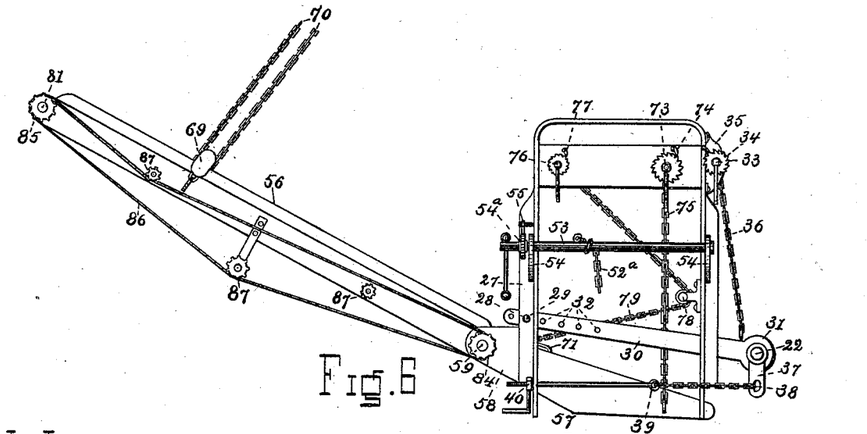
Fig. 6, is an end view of the frame or shell, the plows being omitted, and also a side view of the elevator and mechanism for attaching it to the frame or shell.
Figure 7:
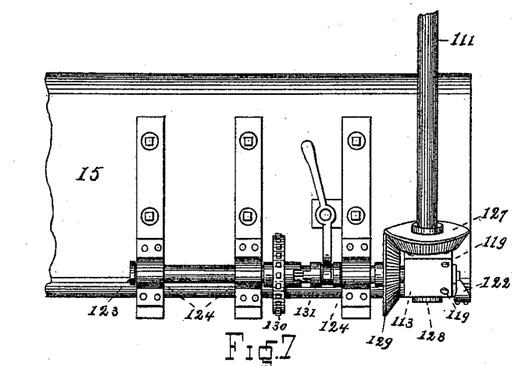
Fig. 7, is a top view of one end of the frame or shell showing a plan view of the mechanism connected with the outer end of the self adjustable extension power shaft.

I use a right and left hand plow of any suitable pattern placing the same end to end so that the plow points are in opposite directions as shown by the plows 41 and 42 in Fig. 5, the bearing portions 43 of said plows being at a slight angle to each other, and by means of a strap 44 to which the land sides of said plows are bolted, the same are held rigidly together. The strap 44 at each end is extended above the plows and formed into a sleeve 45 rectangular in cross section so as to fit over the part 23 of the plow supporting beam 22, and at suitable positions on said portion of said beam I rigidly secure the collars or stops 46. It will be seen that if the car, and said frame or shell are moving in the direction indicated by the arrow in Fig. 5, the resistance of the earth against the plow 41, will cause it and the attached plow 42 to move or slide by reason of the sleeves on the plow supporting beams until a sleeve comes in contact with the collar or stop 46, which prevents further movement of the plows and holds the same in operative position and also adjusts the operative plow opposite the opening 16 in the frame or shell so that the clay or earth excavated and raised by the plow will be thrown off upon the elevator belt as hereinafter explained. If the car, and frame or shell, be moved in an opposite direction, it will be seen that said plows will be moved in the opposite direction, and held in position by the opposite collar or stop 46. It will also be seen that by means of the crank shafts and chains, the plow supporting beam may be elevated or lowered, or one end elevated or lowered as desired, and retained in any desired position by means of the ratchets and pawls, and thus adjust the plows vertically, and independently of the frame or shell, and it will also be seen that by means of the pins, and bearings therefor, and the pin holes in the eye beam, said plows may be adjusted laterally and independently of the frame or shell. It will also be observed that by means of the vertical short bars 37, and chain and threaded eye bolt connections, and nuts, the plow supporting beam may be partially rotated, and secured in such position thus giving an angular adjustment to the plows.

Near the respective ends of the car, are secured to its body in any suitable manner draft beams 47 and 48, projecting laterally from the sides of the car, these beams are each slotted longitudinally and horizontally, and through each slot is passed a threaded bolt 49, having attached at one end a sheave 50, and the opposite end is provided with a nut 51 to retain said bolt in said slot. Each end of the plow supporting beam is provided with a clevis 52, to each of which is attached a chain 52ª, each chain passes around a sheave 50 and is returned and attached at its opposite end to a crank shaft 53, supported in the ear bearings 54 attached to the frame or shell. Each crank shaft 53 is provided with a ratchet wheel 54ª, and pawl 55 attached to an ear bearing. It will be observed that by sliding the bolts and sheaves in the slots of the draft beams in line with the draft, and tightening the chains by means of the crank shaft, much of the strain, while operating the plows, will be taken off the vertical beam and rack beams.

The elevator frame is constructed in two parts, that is a main frame 56 and a smaller frame 57, both frames being constructed of parallel side bars, of such width apart as may be desired, and connected by cross bars in any suitable manner, and also being provided with a suitable number of cross rollers to accommodate the elevator belt, as the construction of such class of elevators is well known and in common use, it is not necessary to more particularly describe the same.

On either side of the opening 17 in the frame or shell I rigidly attach ears 58, and to which ears I secure the inner ends of the elevator frame 56 by the elevator drive shaft 59 so that said frame may swing upon such shaft, and I also secure to the body of the car two upright posts 60 and preferably the top of said posts are slotted to receive in suitable bearings the two pulleys 61 and 62. I also secure to the two posts in suitable bearings, the crank shaft 63 provided with a ratchet wheel 64, and a pawl 65 attached to bearing so as to operate with said ratchet. I also prefer to secure to a side of each post 60 another and shorter post 66, and to each of which I attach in suitable bearings a combined short crank arm and ratchet wheel 67, which is also provided with a suitable pawl 68, to operate with said ratchet. Near the outer end of the elevator frame and upon each side thereof I attach a sheave 69. I secure suitably to the crank shaft 63 the ends of two chains 70—70 which respectively pass around a sheave 69, the opposite end being attached to a crank shaft 67.

It will be seen that by means of the crank shaft 63 and the chains the outer end of the elevator may be elevated or lowered, and held in any desired position by means of the ratchet wheel and pawl, and it will also be seen that if one side of the elevator frame be higher or lower than the other side, the same may be leveled by means of the chain and the short crank shaft, and held in position by the ratchet and pawl, or if it be desired to raise or lower one side of the frame, either higher or lower than the other side, this likewise may be accomplished by means of the short crank shaft and chain. The short elevator frame passes through the opening 16 and 17 of the frame or shell, and is provided with loops 71 near its inner end and at its sides through which it is secured to the ears 58 by means of the threaded bolt and nut 72. The crank shaft 73 and its ratchet wheel are supported in the frame or shell longitudinally in proper bearings, having a pawl 74 attached to the frame or shell to operate with said ratchet, and attached to said crank shaft are two chains 75 the opposite ends of which are attached suitably to the short elevator frame near its inner end, and it will be observed that by means of these chains and said crank shaft the inner end of the short elevator frame may be raised or lowered. The crank shaft 76 and its ratchet wheel are supported in the upper part of the frame or shell near its outer side longitudinally in proper bearings, having a pawl 77 attached to the frame or shell to operate with said ratchet, and upon the opposite side of the frame or shell I attach two pulleys 78 in suitable bearings, and in suitable positions, and near the outer end of the short elevator frame I suitably attach thereto two chains 79, each of which passes inward around one of said pulleys and then outward to said crank shaft to which the same are attached. On the inner end of the short frame is attached in suitable bearings the elevator belt roller 80 and at the outer end of the main frame is attached in suitable bearings the elevator belt roller 81, around which rollers is an endless elevator belt 82. By means of the crank shaft 76, the pulleys and chains, the short elevator frame, through the medium of its loop 71 and the bolt 72, may be moved inward and thus tighten the elevator belt.

At an end of the elevator drive shaft, outside the frame, are secured rigidly thereto the sprocket wheels 83 and 84 and also upon the roller shaft 81 outside of the frame is secured rigidly thereto the sprocket wheel 85 and an endless sprocket chain 86 passes around the sprocket wheels 84 and 85 for the purpose of driving the elevator belt, and such chain may if desired pass around one or more idler sprocket wheels 87 in suitable bearings upon said frame.

Power for driving the elevator belt is transmitted from a motor, and which may be a stationary steam engine, properly attached and secured upon the car body, and I also provide a main driving shaft and pulley 88 suitably secured in bearings upon a frame 89, such frame being properly attached and secured to the car body, and I also provide another shaft 90 and pulley 91 suitably mounted in bearings upon a frame 92 and which frame is properly secured and attached to the car body near a side thereof and adjacent to the frame or shell 15, and an endless belt 93 passes around said pulleys. I convey or transmit power from the pulley and shaft 90 to the elevator drive shaft 59 by means of a self adjustable extension power shaft and gearing of novel construction, and which I will now describe.

Figure 16:
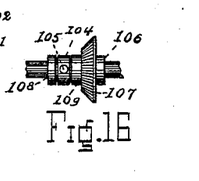
Figure 17:
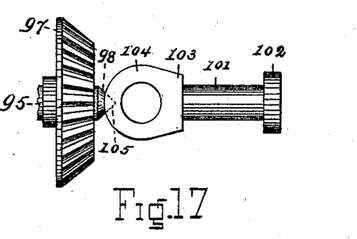

I secure to the shaft 90 the gear wheel 94, and the shaft 95 is mounted in suitable bearings in the frame 92 and secured to the said shaft is a gear wheel 96, which meshes with the gear wheel 94 and there is also secured to said shaft 95 a bevel gear wheel 97, and such shaft projects slightly beyond said bevel gear wheel 97 and has a cone shaped termination 98 as shown by the broken lines in Fig. 17. The frame 99 is suitably secured to the car body and is provided with a shaft bearing or box 100 constructed to receive and support the shaft 101 between the collars 102 and 103 of said shaft, and projecting from said collar 103 is a cross sleeve 104. The axis of shaft 104 is secured in horizontal line longitudinally with the axis of shaft 95, and the sleeve 104 is provided with a countersink depression 105 in its exterior surface, cone shaped in form, constructed to register with and receive the cone shaped termination 98 of the shaft 95, see Figs. 16 and 17. The sleeve 106 has rigidly secured thereto the bevel gear wheel 107 and such sleeve is constructed to be inserted through the cross sleeve 104, and rotate therein, said sleeve being held in position by its collars 108 and 109 on either side of the cross sleeve 104. The inner surface of the sleeve 106 is provided with a longitudinal tongue 110. The self adjustable extension power shaft 111 is provided with a longitudinal groove 112, said shaft is adapted to be inserted in the sleeve 106 and its groove registers with and receives the tongue 110.

Figure 8:
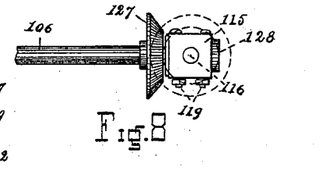
Figs. 8, 9, 10, 11, and 12, are views of details of the latter.
Figure 9:
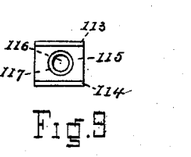
Figure 10:
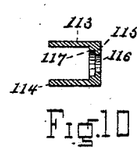
Figure 11:
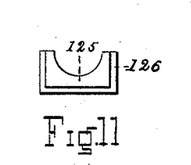
Figure 12:
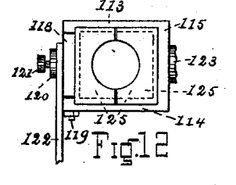
Figure 13:
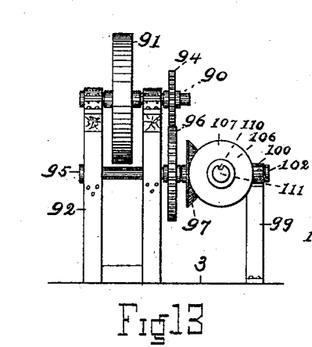
Figs. 13, 14, 15, 16, and 17, are views of details of mechanism connected with the inner end of the self adjustable extension power shaft.
Figure 14:
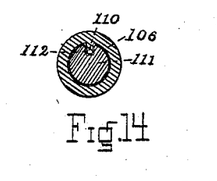
Figure 15:
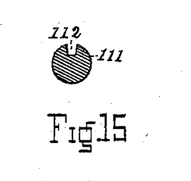

It will be observed that the rotation of the bevel gear wheel 97 causes the rotation of the bevel gear wheel 107 and its sleeve 106, and said tongue and groove registering causes like rotation to the said shaft 111, and said shaft may oscillate or swing upon its pivoted connection formed by the cross sleeve 104 and shaft 101 in its bearings, without interrupting the rotation of said bevel gear wheels 97 and 107 or said shaft 111, and it will also be observed that the cone shaped portion of the shaft 95 entering the depression 105 in the cross sleeve, assists in retaining the parts in position. It will also be seen that the self adjustable extension power shaft 111, may be moved longitudinally in the sleeve 106 without interrupting the rotation of said shaft, or of said bevel gear wheels. The box bearing frame, consists of two parallel bars 113 and 114 connected together by a cross bar 115, provided with a circular aperture 116 on the inner side counter bore, as at 117. The cross bar 118 is secured between the parallel bars 113 and 114 at their opposite ends by the bolts and nuts 119 or by any other suitable means, such cross bar being provided on its exterior surface with a circular projecting boss 120, which is longitudinally perforated as also the cross bar, to receive the threaded set screw 121, and such boss is supported in a circular aperture in the arm 122 which is rigidly attached to the frame or shell. The horizontal shaft 123 passes at one end into the circular aperture 116 of the cross bar 115, and at its end is provided with a cap or collar adapted to fit in the counter bore 117, its head or end being flush with the inner surface of said cross bar, and such shaft being mounted in bearings 124. The box consisting of the two halves 125 are provided with flanges 126 and are placed in said frame as shown in Fig. 12, said flanges preventing the box from sliding through the frame in one direction. It will also be seen that as the box occupies the space in the frame, a side thereof bears against the end or cap of the shaft 123 retaining the same in position, while by means of the set screw 121 the box may be secured in said frame, and it will also be observed that the boss 120 supported by the arm 122, and the shaft 123 supported in its bearings form pivots upon which the frame and box may rotate or turn. Near the end of the shaft 111, I secure rigidly thereto a bevel gear wheel 127 and the end of said shaft is passed through the box supported in said frame, and secured in position therein by the collar 128 rigidly attached thereto, so as to cause the side of the bevel gear wheel 127 to rest against the surface of the box in said frame as shown in Fig. 8. I secure rigidly to the shaft 123 the bevel gear wheel 129 arranged to mesh with the bevel gear wheel 127, and I also place upon said shaft a loose sprocket wheel 130, in connection with a square jaw clutch 131, for transmitting the motion of said shaft to said sprocket wheel, and an endless sprocket chain 132 passes around said sprocket wheel, and sprocket wheel 83 transmitting motion to the elevator drive shaft 59.

From the description it will be seen that the frame supporting the boxes or bearings for the outer end of said shaft 111, is so arranged that it may turn or swing upon the pivots formed by its boss in said bearing, and said horizontal shaft 123, and it will therefore be readily seen that as the frame or shell is adjusted either vertically or laterally said shaft 111 and its gearing will automatically adapt themselves to the changed position without interruption to rotation of their parts.

The car may be propelled by a locomotive, or by suitable gearing the motor used upon said car for furnishing power to drive the elevator belt, may also be utilized for propelling the car. In practice, the earth is first removed so as to expose the clay, a temporary track is then constructed upon it, and the car with my machine is then propelled back and forth upon such track, the machine being adjusted from time to time in the modes I have described so as to excavate and elevate the clay within reach of said machine, thereafter the track is pushed over and aligned, so as to give a new working space for the machine, parallel with the former, this being repeated from time to time as desired.

From the description given persons skilled in the art will understand the mode of construction and operation of my device.

I do not broadly claim the combination of an inclined elevator and plow, hung to a frame in such manner as to operate together, or where the plow may be adjusted vertically, or the outer end of the elevator raised or lowered, as such combinations are old.

It will be understood that I have described what I deem the best method of constructing my machine, yet I do not wish to limit myself to the precise construction disclosed, as many modifications and changes in the respective parts may be made without departing from the scope of my invention.

What I claim as new, and desire to secure by Letters Patent, is—

1. In a ditching and grading machine in connection with a tram way car, of the combination of a shell, the plows and elevator attached thereto, the vertical beam attached to said shell, the jib crane secured to the car body, the chain block suitably attached to the jib crane and vertical beam, the horizontal rack bars supported in bearings in the car body, their outer ends connected to the vertical beams by the sleeves, the vertical shaft and pinions meshing with the cogs of the rack-bars, such shaft secured in bearings in the car body, the vertical posts attached to the car-body, and the chains connecting such posts with the elevator, substantially as described.

2. In a ditching and grading machine in connection with a tram-way car, of the combination of a shell, the plows and elevator attached thereto, the vertical beam attached to said shell, the jib-crane secured to the car body, the chain block suitably attached to the jib-crane and vertical beam, the horizontal rack bars supported in bearings in the car body, their outer ends connected to the vertical beam by the sleeves, the vertical shaft and pinions meshing with the cogs of the rack bars, such shaft secured in bearings in the car body, the vertical posts attached to the car body, the chains connecting such posts with the elevator, the slotted draft beams attached to the car, the sheave and bolt secured thereto, the chain secured at one end to the plow supporting beam and passing around the sheave, its other end secured to the crank-shaft attached to the said shell, the ratchet wheel attached to the crank-shaft and the ratchet operating therewith substantially as described.

3. In a ditching and grading machine attached to a tram-way car, in combination with the shell supported from the car body at its side, of the plow supporting beam attached to the shell, the plows end to end, attached together by the strap, the plow points in opposite directions and in vertical line, the sleeves attached to the plows, and supported upon the plow supporting beam, and the stop collars attached to said beam substantially as described.

4. In a ditching and grading machine attached to a tram-way car, in combination with the shell supported from the car body at its side, of the plow supporting beam carrying the plows, the eye beams supporting the former beam through their eyes, the opposite ends of such eye beams pivoted to the opposite side of the shell so that the same may swing upon their respective pivots, the crank-shafts, ratchet and pawl suitably attached to said shell, and the chain connected with a respective crank-shaft and eye beam, substantially as described.

5. In a ditching and grading machine attached to a tram-way car, in combination with the shell supported from the car body at its side, of the plow supporting beam carrying the plows, said beam supported in eyes at one of the ends of each eye beam, the opposite end of each eye beam secured to the opposite side of the shell by a pin, its free end attached by a chain to a crank shaft, such crank shaft mounted in suitable bearings on the shell, each crank shaft carrying a ratchet wheel operated upon by a pawl attached to the shell, each end of the plow supporting beam provided with a short vertical bar extending in opposite directions, each bar attached to a threaded eye bolt and chain, each eye bolt passing through a suitable aperture in the opposite side of the shell and each threaded eye bolt provided with a suitable nut, substantially as described.

6. In a ditching and grading machine attached to a tram-way car, the combination of the inverted U shaped shell, the lower central portion of its sides cut out, such shell supported from the car body at its side, the elevator having its inner end extended through such cut out portion of said shell and attached thereto, its outer end supported from the car body, the plows adjacent to the inner end of said elevator attached to the plow supporting beam and such beam attached to said shell, substantially as described.

7. In a ditching and grading machine attached to a tram-way car provided with a motor, and a shell suspended to the side of the car, constructed so as to be moved vertically and laterally and independently of said car, and such shell carrying an elevator and plows, of the combination of the self adjustable extension power shaft, the sleeves and bearings, the gearing, the drive pulley, the horizontal shaft in bearings attached to said shell, and the sprocket wheel and square jaw clutch upon said shaft, substantially as described.

8. In a ditching and grading machine attached to a tram-way car provided with a motor, and a shell suspended to the side of the car, constructed so as to be moved vertically and laterally, and independently of said car, such shell carrying plows and an elevator, of the combination of the self adjustable extension power shaft provided with a longitudinal groove, the sleeve provided with the interior longitudinal tongue, bevel gear wheel and collar, the pulley in bearings upon the frame, the gear wheel upon the pulley shaft, the shaft 95 mounted in suitable bearings in the frame, the gear wheel and the bevel gear wheel secured upon said shaft, the cone shaped termination of said shaft, the shaft 101 mounted in a suitable bearing upon the frame 99, the cross sleeve attached to said shaft provided with the counter sink depression in its exterior surface, the frame having one cross bar provided with a circular aperture and counter bore, the other cross bar provided with a boss, threaded aperture and set screw, the arm 122, the box 125, the horizontal shaft provided with the cap mounted in bearings upon said shell and also provided with the bevel gear wheel and the sprocket wheel, the bevel gear wheel rigidly secured upon said self adjustable extension power shaft and the collar 128, substantially as described.

9. In a ditching and grading machine attached to a tram way car provided with a motor, the combination of the inverted U shaped shell, the lower central portion of its sides cut out, such shell supported from said car, the elevator having its inner end extended through such cut out portion of said shell and attached thereto, its outer end supported by chains secured to said car, the plows supported by said shell, the self adjustable extension power shaft, the sleeve and bearings, the gearing, the drive pulley, the horizontal shaft in bearings attached to said shell, the sprocket wheel secured upon said shaft and the endless sprocket chain around said wheel and the drive sprocket wheel of said elevator, substantially as described.

10. In a ditching and grading machine attached to a tram-way car, the combination of the inverted U shaped shell, the lower central portion of its sides cut out, such shell supported from said car, the elevator consisting of the main frame and smaller frame, the inner end of the main frame attached to said shell its outer end supported by chains attached to said car, the smaller frame extended through the cut out portion of said shell, the loops 71 upon said frame, the pulleys 78, the crank shaft and ratchet 76, the pawl 77, the chains 79, the crank shaft and ratchet 73, the pawl 74 and the chains 75, substantially as described.

GEORGE W. DYE.

Witnesses:
L. N. PORTER,
T. A. MURPHY.